United States Patent
Mathewes et al.

(10) Patent No.: US 6,751,520 B2
(45) Date of Patent: Jun. 15, 2004

(54) INTRINSICALLY SAFE MICROPROCESSOR CONTROLLED PRESSURE REGULATOR

(75) Inventors: Christopher W. Mathewes, Greenville, SC (US); Josef Vollmer, Bernbeuren (DE); Max Schrobenhauser, Peiting (DE); Lawrence J. Worde, Macomb Township, MI (US)

(73) Assignee: Ross Operating Valve Company, Troy, MI (US)

( * ) Notice: Subject to any disclaimer, the term of this patent is extended or adjusted under 35 U.S.C. 154(b) by 89 days.

(21) Appl. No.: 10/051,466

(22) Filed: Jan. 18, 2002

(65) Prior Publication Data

US 2002/0161479 A1 Oct. 31, 2002

Related U.S. Application Data

(63) Continuation of application No. PCT/US01/19535, filed on Jun. 19, 2001.
(60) Provisional application No. 60/212,266, filed on Jun. 19, 2000.

(51) Int. Cl.[7] .......................... G06F 19/00; G05B 19/04; B05B 9/04
(52) U.S. Cl. ....................... 700/123; 700/250; 239/373; 118/323
(58) Field of Search ................................ 700/123, 250, 700/264, 260, 245; 239/373, 568, 337; 118/323, 300

(56) References Cited

U.S. PATENT DOCUMENTS

| | | | | |
|---|---|---|---|---|
| 4,024,961 A | * | 5/1977 | Stolpe | 414/729 |
| 4,300,198 A | | 11/1981 | Davini | 700/264 |
| 4,532,148 A | * | 7/1985 | Vecellio | 427/480 |
| 4,561,592 A | * | 12/1985 | Fender et al. | 239/587.5 |
| 4,611,695 A | * | 9/1986 | Kato et al. | 118/323 |

(List continued on next page.)

FOREIGN PATENT DOCUMENTS

| | | |
|---|---|---|
| DE | 196 44 801 C1 | 5/1998 |
| EP | 0 794 370 A1 | 9/1997 |
| JP | 11076887 | 3/1999 |

OTHER PUBLICATIONS

Beetz, M. "Structured Reactive Controllers–Controlling Robots that Perform Everyday activity", Proceedings of the 3rd Annual Conference on Autonomous Agents, 1999, pp. 228–235.*

Santa et al., "Development of a Neural Controller for Motion Control of a Piezoelectric Three–Legged Micromanipulation Robot" Proceedings of the 1998 IEEE/RSJ Intl. Conf on Intelligent Robots and Systems, Oct. 1998, pp. 788–793.*

*Primary Examiner*—Ramesh Patel
*Assistant Examiner*—Kelvin Booker
(74) *Attorney, Agent, or Firm*—Frank L. Lollo; Mark L. Mollon; MacMillan, Sobanski & Todd

(57) ABSTRACT

An intrinsically safe microprocessor controlled pressure regulator for operation in a hazardous environment. The intrinsically safe microprocessor controlled pressure regulator receives control commands that are input to a microprocessor in the hazardous environment. The microprocessor generates control commands to control operation of an intrinsically safe solenoid valve and an intrinsically safe piezo electric valve. The piezo electric valve generates an output signal for controlling operating parameters of the paint gun. One or a plurality of microprocessors may operate within a hazardous environment in order to control one or a plurality of intrinsically safe valves in the hazardous environment.

20 Claims, 4 Drawing Sheets

U.S. PATENT DOCUMENTS

| | | | |
|---|---|---|---|
| 4,614,164 A * | 9/1986 | Kato et al. | 118/323 |
| 4,812,294 A | 3/1989 | Combs | 422/72 |
| 4,827,395 A * | 5/1989 | Anders et al. | 700/9 |
| 4,838,311 A | 6/1989 | Vetter | 137/624.2 |
| 4,914,721 A * | 4/1990 | Glaeser et al. | 307/116 |
| 4,951,873 A | 8/1990 | Ashworth et al. | 239/67 |
| 4,957,060 A * | 9/1990 | Cann | 118/699 |
| 5,079,491 A * | 1/1992 | Nose et al. | 318/568.11 |
| 5,127,363 A * | 7/1992 | Nakamura et al. | 118/695 |
| 5,429,682 A | 7/1995 | Harlow, Jr. et al. | 118/681 |
| 5,636,798 A * | 6/1997 | Buschor | 239/696 |
| 5,730,359 A * | 3/1998 | Wurth | 239/66 |
| 5,949,683 A * | 9/1999 | Akami et al. | 700/123 |
| 5,964,407 A * | 10/1999 | Sandkleiva | 239/112 |
| 5,980,994 A | 11/1999 | Honma et al. | 427/475 |
| 5,989,643 A * | 11/1999 | Nakagawa et al. | 427/424 |
| 6,082,290 A * | 7/2000 | Conlin | 118/326 |
| 6,190,454 B1 * | 2/2001 | Anderson | 118/300 |
| 6,257,700 B1 * | 7/2001 | Aihara et al. | 347/44 |
| 6,276,057 B1 * | 8/2001 | Aihara et al. | 29/890.1 |
| 6,346,150 B1 * | 2/2002 | Conlin | 118/326 |
| 6,398,870 B1 * | 6/2002 | Kaya et al. | 118/323 |
| 6,439,480 B1 * | 8/2002 | Velde | 239/327 |
| 6,443,371 B1 * | 9/2002 | Arnfindsen | 239/373 |
| 6,477,913 B1 * | 11/2002 | Akeel et al. | 74/490.03 |
| 6,497,476 B1 * | 12/2002 | Namba et al. | 347/68 |
| 2003/0136336 A1 * | 7/2003 | Fouvet et al. | 118/300 |

* cited by examiner

INTRINSICALLY SAFE MICROPROCESSOR CONTROLLED PRESSURE REGULATOR

CROSS-REFERENCE TO RELATED APPLICATIONS

This application is a continuation of International Application No. PCT/US01/19535, having an international filing date of Jun. 19, 2001. This application also claims the benefit of U.S. Provisional Application No. 60/212,266, filed Jun. 19, 2000. The disclosures of the above applications are incorporated herein by reference.

FIELD OF THE INVENTION

The present invention relates generally to intrinsically safe pressure regulators and, more particularly, to an intrinsically safe control system for a pressure regulator for operation in a hazardous environment.

BACKGROUND OF THE INVENTION

Many industrial environments utilize chemicals, solvents, and other compositions which are often volatile and create hazardous atmospheres. Some industries operate electronic equipment in these hazardous atmospheres. Because the hazardous atmospheres are often flammable, electronic equipment operating in these atmospheres preferably is designed to reduce the opportunity for igniting the hazardous atmosphere. This is accomplished by limiting the energy required to operate the electronic equipment, thereby significantly reducing the opportunity for creating sparks and other igniting phenomenon, such as heat.

In a particular example, manufacturers of automobiles utilize paint booths in which robots paint the vehicles. The robots efficiently apply paint to the vehicles. When the robots spray paint, a paint spray atmosphere is created. The paint spray atmosphere is typically a flammable or hazardous environment due to the composition of chemicals used in the paint process. Certain areas of the paint booth are considered hazardous and require utilization of intrinsically safe equipment, while other areas of the paint booth are non-hazardous and do not require utilization of intrinsically safe equipment. With respect to a paint robot, air pressure causes the discharge of paint from a paint gun typically located at the end of a robot arm. The air pressure generated to control the paint functions typically is modulated through use of pilot pressures that modulate the output pressure that controls various paint gun functions. Operating solenoids typically creates the pilot pressure.

In a typical paint operation, is desirable to accurately and quickly vary the flow rate of paint to adjust to the contours of the vehicle in order to optimally apply the paint. Accurately and quickly controlling the application of paint typically requires utilizing a controller in a closed loop mode. The controller compares a downstream pressure against a target pressure and creates an error signal to adjust the paint flow.

In such systems, designers favor placing pressure control valves to control the flow of paint as close to the paint gun as possible. Several factors limit how close the pressure control valves can be placed to the paint gun. First, the pressure control valves are typically operated electronically. In order to operate the pressure control valves as close to the paint gun as possible, the pressure control valves must be intrinsically safe. Otherwise, the pressure control valves must be located outside of the hazardous area. When located outside the hazardous area, the pressure control valves are typically further from the tip of the paint gun. This results in a slower response time at the paint gun, thereby reducing the ability to optimally control the paint flow. Further, existing technologies do not provide pressure control valves which operates in an intrinsically safe mode when considered in conjunction with the control devices which operate the pressure control valves. Thus, the control package, including a controller and a pressure control valve, typically operates outside the hazardous area, so as to meet intrinsically safe standards.

SUMMARY OF THE INVENTION

The present invention is directed to an intrinsically safe pressure control system for controlling operation of a device, where a portion of the system operates in a safe area, and a portion of system operates in a hazardous area. The control system includes a controller located within the hazardous area. The controller receives input signals from the safe area and generates a control signal. A first piezo electrically controlled valve is located within the hazardous area. The piezo electrically controlled valve generates a pressure in response to the control signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. However, it should be appreciated that the intrinsically safe control system of the present invention may find utility in a wide variety of applications that require intrinsically safe operation.

Figure 1:
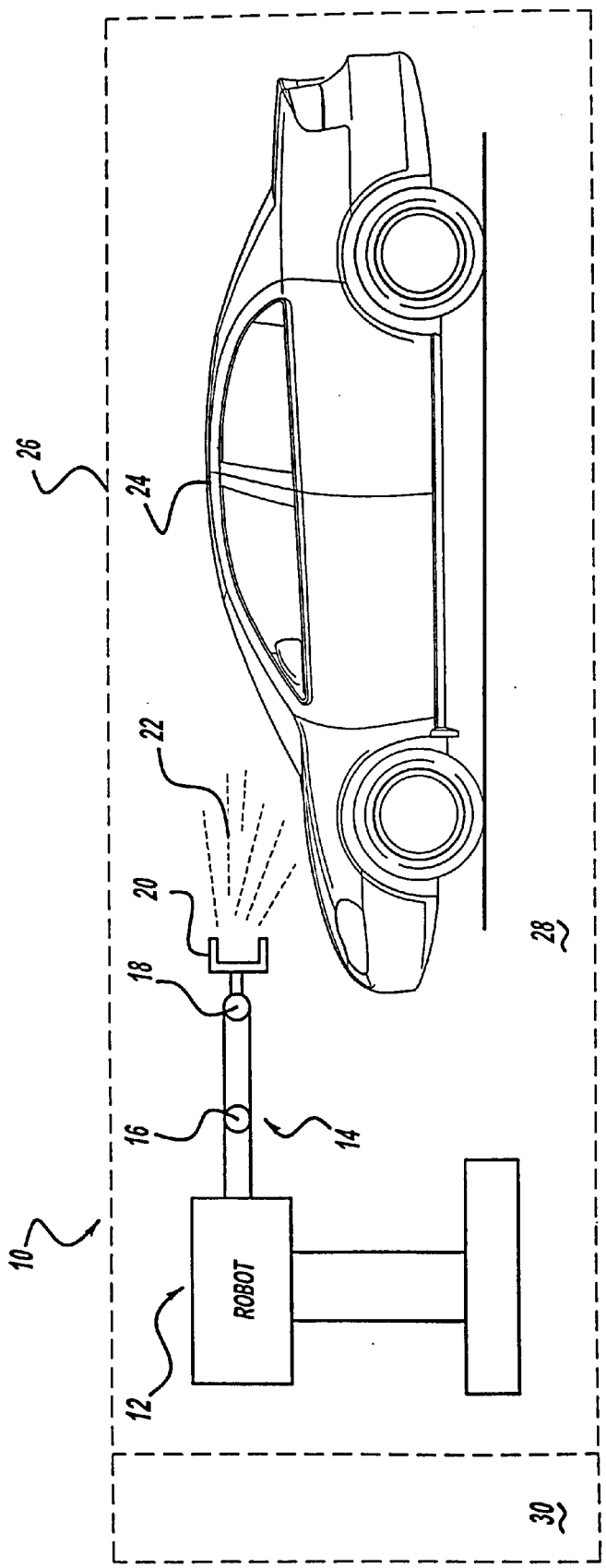
FIG. 1 is a diagram of a paint robot and a vehicle in a paint booth arranged in accordance with the principles of the present invention.

FIG. 1 depicts an intrinsically safe control system 10 according to a first embodiment of the present invention, which will be described herein with specific respect to a paint spray system. Intrinsically safe control system 10 includes a robot 12. Robot 12 includes an arm having joints, such as an elbow joint 16 and a wrist joint 18. Robot 12 includes a paint gun or bell 20 located at the end of arm 14. Paint gun 20 disperses a paint spray 22 onto a vehicle 24, thereby applying a coating of paint onto vehicle 24.

Intrinsically safe control system 10 operates generally within a spray booth 26. Because of the nature of solvents and chemicals used in a paint operation, dispersion of paint creates a hazardous zone 28 and a safe zone 30. Hazardous zone 28 defines an area that requires caution with respect to eliminating possible sources of ignition. Hazardous zone 28 may contain all or a portion of robot 12 as well as other system components. Hazardous zone 28 typically requires operation of intrinsically safe devices. Intrinsically safe devices are generally referred to as devices that operate using limited energy in order to substantially reduce the possibility of ignition of flammable chemicals.

Figure 2:
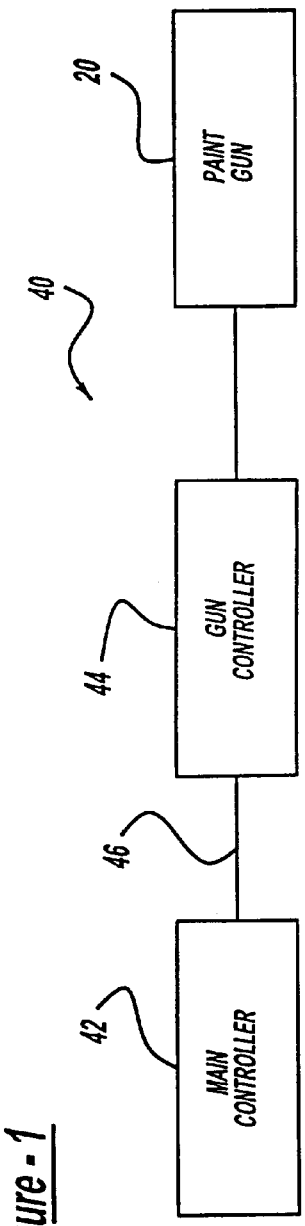
FIG. 2 is a block diagram of an intrinsically safe control system arranged in accordance with the principles of the present invention.

FIG. 2 depicts a block diagram of an intrinsically safe control system 40 for paint gun 20 of robot 12. A main controller 42, which may be located integrally with robot 12 or remotely from robot 12, controls the overall operation of robot 12, including paint gun 20. Main controller 42 may be located within hazardous zone 28 or, preferably, within safe zone 30. Main controller 42 determines the required output of paint in accordance with particular contours and shapes of vehicle 24. Main controller 42 outputs a signal to gun controller 44. The signal output from main controller 42 preferably communicates with gun controller 44 over network 46. Preferably, communication between main controller 42 and gun controller 44 occurs utilizing a controller area network (CAN) protocol. Such protocol is well known to those skilled in the art. One skilled in the art will recognize, however, that other communications protocols may be implemented in order to effect communication between main controller 42 and gun controller 44 such as, but not limited to, Ethernet, inner bus, outer bus, and the like.

While main controller 42 preferably determines the output of paint gun 20 in accordance with various contours and stages of the applying paint to vehicle 24, gun controller 44 specifically implements control commands to ensure that paint gun 20 operates as commanded by main controller 42. In particular, gun controller 44 preferably generates control signals to operate a paint gun regulator 21 to control the flow, distribution, and dispersion of paint output from paint gun 20.

Figure 3:
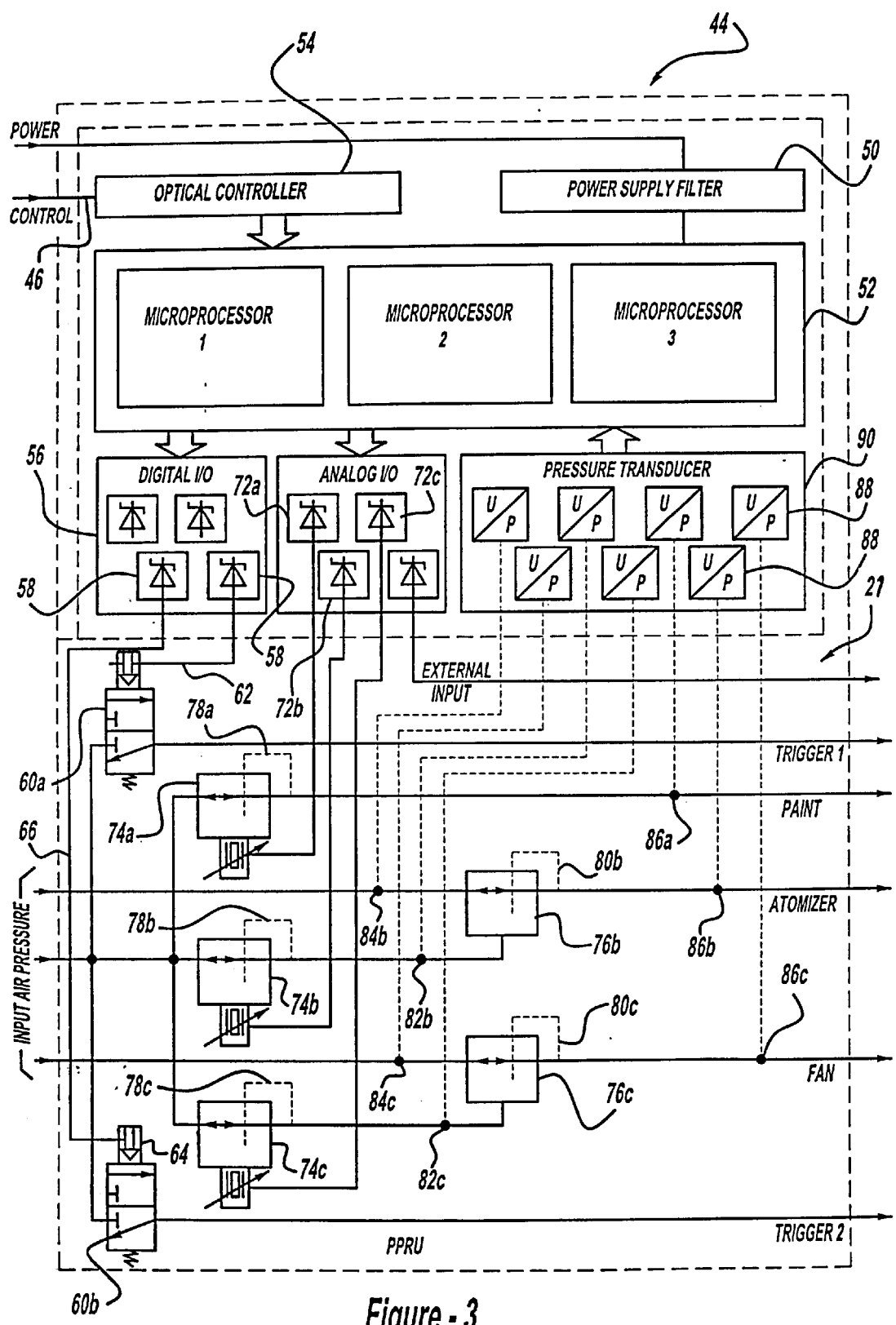
FIG. 3 is an expanded block diagram of the paint gun controller according to a first embodiment of the present invention.

FIG. 3 depicts an expanded block diagram of gun controller 44 and paint gun regulator 21. In particular, gun controller 44 receives a control signal from main controller 42 and power from a power source. Gun controller 44 in turn generates control signals in order to modulate an input air pressure applied to paint gun regulator 21 in order to control various output functions of paint gun 20. Such output functions include optional triggering or on/off operation, paint control, atomizer control, and disbursement or fanning out of the output spray. Gun controller 44 receives a power signal, which is input to a power supply filter 50. Power supply filter 50 outputs a power signal suitable for operating a bank of microprocessors 52 which comprise microprocessor 1, microprocessor 2, and microprocessor 3. It should be understood, however, that microprocessor bank 52 may contain greater than or less than three microprocessors depending upon the particular implementation of the intrinsically safe system.

Microprocessor bank 52 generates output control signals in accordance with input control signals. The input control signals are received from bus network 46. Preferably, bus network control signals are exchanged on bus network 46 utilizing a fiber optic interconnection to maintain intrinsically safe operation. Alternatively a hardwired, electrical interconnection (e.g. electrical wires) may implement bus network 46. This can be accomplished using a control via electrical (wire based) field bus system or an electrical analogous control (e.g. 0–10V corresponding to 0–10 bar).

Network 46 connects to an optical controller 54, which converts the optical control signals into electrical control signals that are input to the respective microprocessors of microprocessor bank 52. It should be appreciated that controller 54 may be optical or hardwired depending on the particular application. Each microprocessor of microprocessor bank 52 operates a pressure control valve in accordance with the control signals. The microprocessors of microprocessor bank 52 receive the control signal or signals and generate output signals that may be either digital or analog.

As briefly described above, paint gun regulator 21 has several control features including an optional on/off or trigger control, a paint control, an atomizer control, and a fan control. With respect to the on/off or trigger control, a digital control signal is output to a digital input/output (I/O) circuit 56. Digital I/O circuit 56 has one or a plurality of I/O ports 58 which generate a digital signal. As shown in FIG. 3, one digital I/O port 58 outputs a digital signal to a solenoid control valve 60 on digital control line 62. Solenoid control valve 60 enables operation of the trigger by enabling input air pressure to selectively be applied to or cut-off from the trigger in order to effect a respective on/off operation. In FIG. 3, solenoid control valve 60 is shown as a two part valve 60a, 60b, where both parts are interconnected to form one mechanical element, although shown as two mechanical elements. Solenoid control valve 60 outputs trigger 1 and trigger 2 signals. Operation of solenoid control valve 60 may be monitored by the microprocessors of microprocessor bank 52 through input to digital I/O bank 56. A sensor 64 outputs a signal on digital input line 66 which is input to an additional I/O port 58 of digital I/O bank 56. As shown, solenoid control valve 60 merely applies or cuts-off input air pressure to the respective trigger 1 and trigger 2 output lines.

In addition to digital control of optional triggers 1 and 2, gun controller 44 enables analog control of a paint, atomizer, and fan signal in order to vary operation of paint gun regulator 21 accordingly. The respective microprocessors output analog control signals to analog input/output (I/O) bank. As shown in FIG. 3, the analog I/O bank includes four analog I/O ports. Three of the analog I/O ports 72a, 72b, 72c output analog signals to control respective piezo electric valves 74a, 74b, 74c. Piezo electric valves 74a, 74b, 74c operate as pilot valves to variably modulate input air pressure for output on a respective paint, atomizer, and fan control line. The modulated input air pressure provides an output signal that controls operation of the respective paint, atomizer, arid fan functions of paint gun regulator 21. Each piezo electric valve 74a, 74b, 74c receives an input air pressure and the output of each piezo electric valve 74a, 74b, 74c is varied in accordance with the magnitude of the analog signal output from analog I/O ports 72a, 72b, 72c. Varying the electrical signal output by the respective analog I/O ports 72a, 72b, 72c varies displacement of a piezo electric element, which in turn varies the output pressure from the respective piezo electric valve 74a, 74b, 74c.

The output pressure from the respective piezo electric valves 74a, 74b, 74c may be input to a booster or regulator valve 76b, 76c. Regulator valves, 76b, 76c receive as a first input an input air pressure, which may be of a different pressure than the input air applied to piezo electric valves 74a, 74b, 74c. The output signal from the respective piezo electric valves 74a, 74b, 74c is applied through control lines to the respective regulator valves 76b, 76c. Regulator valves 76b, 76c regulate the output pressure in accordance with the pilot signal output from respective piezo electric valves 74b, 74c. One skilled in the art will recognize that regulator valves 76b, 76c are optional and that the output pressure from piezo electric valves 74b, 74c may be applied directly to the components of paint gun regulator 21.

In addition to the above-described control, each piezo electric valve 74a, 74b, 74c includes a respective feedback circuit 78a, 78b, 78c. Each feedback circuit 78a, 78b, 78c provides an internal, mechanical feedback mechanism for the respective piezo electric valve 74a, 74b, 74c. Similarly, each regulator valve 76b, 76c includes a respective feedback circuit 80b, 80c that also provides an internal, mechanical feedback function.

In order to achieve more accurate control, microprocessor bank 52, in addition to providing digital and analog output signals, also monitors the pressure at the output of each piezo electric valves 74a, 74b, 74c and regulator valve 76b, 76c. In particular, pressure transducers 82b and 82c are positioned to monitor the air pressure output by respective piezo electric valves 74b, 74c. These pressure transducers also effectively monitor the control pressure input to respective regulator valves 76b, 76c. In addition, external input air pressure applied to regulator valves 76b, 76c is monitored by respective pressure transducers 84b, 84c. Similarly, respective pressure transducers 86b, 86c monitor the air pressure output by each regulator valve 76b, 76c. Pressure transducers 86a, 86b, 86c also effectively monitor the output air pressure to the paint, atomizer, and fan of paint gun regulator 21, respectively. The variable signal output by respective pressure transducers 82, 84, 86 is applied to input ports 88 of pressure transducer bank 90. Pressure transducer bank 90 outputs signals to microprocessor bank 52 that vary in accordance with the sensed pressure. The microprocessors of microprocessor bank 52 can thus determine an error signal between a desired pressure and an actual pressure and adjust the analog signals output from analog I/O bank 70 to each of piezo electric valves 74.

In operation, a microprocessor controls a respective piezo electric valve 74. For example, microprocessor 1 generates control signals for operating piezo electric valve 74a; microprocessor 2 generates control signals for operating piezo electric valve 74b; and microprocessor 3 generates control signals for controlling piezo electric valve 74c. Similarly, microprocessor 1 utilizes pressure signals output by pressure transducers associated with piezo electric valve 74a; microprocessor 2 utilizes pressure signals output from pressure transducers associated with piezo electric valve 74b and regulator valve 76; and microprocessor 3 utilizes pressure transducer signals output by pressure transducers associated with piezo electric valve 74 and regulator valve 76.

Thus, the individual microprocessors 1, 2, 3 of microprocessor bank 52 preferably control respective piezo electric valves 74a, 74b, 74c and regulator valves 76b, 76c in accordance with control signals received on bus network 46. Internal feedback within the gun controller 44 enables more accurate control by comparing an actual output pressure from a desired output pressure of respective piezo electric valve 74a, 74b, 74c, and regulator valves 76b, 76c.

Each component of gun controller 44 preferably operates to enable sufficient control of paint gun regulator 21 while operating in an intrinsically safe mode. Each component of gun controller 44 operates in an intrinsically safe mode. Further yet, while the above intrinsically safe control system 10 has been described with respect to microprocessor bank 52 having three microprocessors and specified numbers of ports for each of digital I/O bank 56, analog I/O bank 70, and pressure transducer bank 90, one skilled in the art will recognize that the number of microprocessors and the number of input/output ports 128 (FIG. 5) may vary in accordance with varying design considerations. For example, in a particular feature of the present invention, microprocessor bank 52 includes three microprocessors in order to limit the operating power required for any one microprocessor to maintain operation within an intrinsically safe range.

Figure 4:
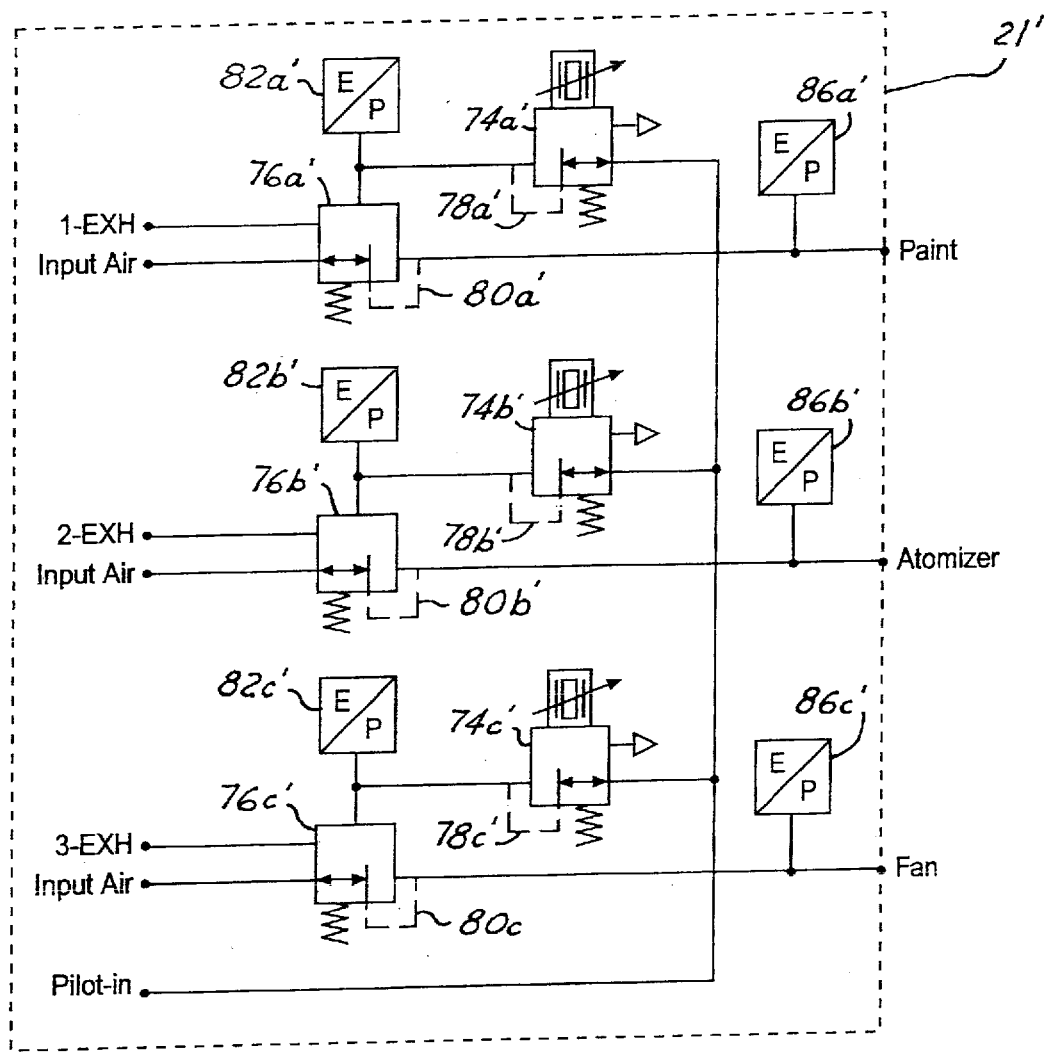
FIG. 4 is an expanded block diagram of the pneumatics with sections removed for clarity of the paint gun according to an alternative embodiment of the present invention.

According to the alternative embodiment of the present invention, which is illustrated in FIG. 4, a paint gun regulator 21' is provided having a three channel regulator system. Paint gun regulator 21' includes several control features such as a paint control, an atomizer, and a fan control. A gun controller, such as 44 of FIG. 3 and 44' of FIG. 5, enables analog control of a paint, atomizer, and fan signal in order to vary operation of paint gun regulator 21' accordingly. The respective microprocessors output analog control signals to analog input/output (I/O) bank 70 of FIG. 3. As described above, analog I/O bank 70 includes a plurality of analog I/O ports 72.

As shown in FIG. 3, analog I/O bank 70 includes four analog I/O ports 72. Three of the analog I/O ports 72a, 72b, 72c output analog signals to control respective piezo electric valves 74a', 74b', 74c' of FIG. 4. Piezo electric valves 74a', 74b', 74c' operate as pilot valves to variably modulate pilot air pressure for output on a respective paint, atomizer, and fan control line. The modulated input air pressure provides an output signal that controls operation of the respective paint, atomizer, and fan functions of paint gun regulator 21. Each piezo electric valve 74a', 74b', 74c' receives an input air pressure and the output of each piezo electric valve 74a', 74b', 74c' is varied in accordance with the magnitude of the analog signal output from analog I/O ports 72a, 72b, 72c. Varying the electrical signal output by the respective analog I/O ports 72a, 72b, 72c varies displacement of a piezo electric element, which in turn varies the output pressure from the respective piezo electric valve 74a', 74b', 74c'.

The output pressure from the respective piezo electric valves 74a', 74b', 74c' may be input to a booster or regulator valve 76a', 76b', 76c'. Regulator valves 76a', 76b', 76c' receive as a first input an input air pressure, which may be of a greater pressure than the input air applied to piezo electric valves 74a', 74b', 74c'. Moreover, this input air pressure to regulator valves 76a', 76b', 76c' may each be separate and discrete, as shown in FIG. 4. The output signal from the respective piezo electric valves 74a', 74b', 74c' is applied through control lines to the respective regulator valves 76a', 76b', 76c'. Regulator valves 76a', 76b', 76c' regulate the output pressure in accordance with the pilot signal output from respective piezo electric valves 74a', 74b', 74c'. One skilled in the art will recognize that regulator valves 76a', 76b', 76c' are optional and that the output pressure from piezo electric valves 74a', 74b', 74c' may be applied directly to the components of paint gun regulator 21.

In addition to the above-described control, each piezo electric valve 74a', 74b', 74c' includes a respective feedback circuit 78a', 78b', 78c'. Each feedback circuit 78a', 78b', 78c' provides an internal, mechanical feedback mechanism for the respective piezo electric valve 74a', 74b', 74c'. Similarly, each regulator valve 76a', 76b', 76c' includes a respective feedback circuit 80a', 80b', 80c' that also provides an internal, mechanical feedback function.

In order to achieve more accurate control, microprocessor bank 52 of FIG. 3, in addition to providing digital and analog output signals, also monitors the pressure at the output of each piezo electric valves 74a', 74b', 74c' and regulator valve 76a', 76b', 76c'. In particular, pressure transducers 82a', 82b', 82c' are positioned to monitor the air pressure output by respective piezo electric valves 74a', 74b', 74c'. These pressure transducers also effectively monitor the control pressure input to respective regulator valves 76a', 76b', 76c'. In addition, respective pressure transducers 86a', 86b', 86c' may monitor the air pressure output by each regulator valve 76a', 76b', 76c'. Pressure transducers 86a', 86b', 86c' also effectively monitor the output air pressure to the paint, atomizer, and fan of paint gun regulator 21'. The operation of pressure transducers 82', 86' is identical to that of pressure transducers 82, 86 described above. However, it should be appreciated that paint gun regulator 21' of FIG. 4 does not include a triggering system as used in the first embodiment, yet does include an additional regulator valve 76a' for control of the paint. One skilled in the art should understand that variations to this system are possible and the present embodiment is used to illustrate merely one such variation.

Figure 5:
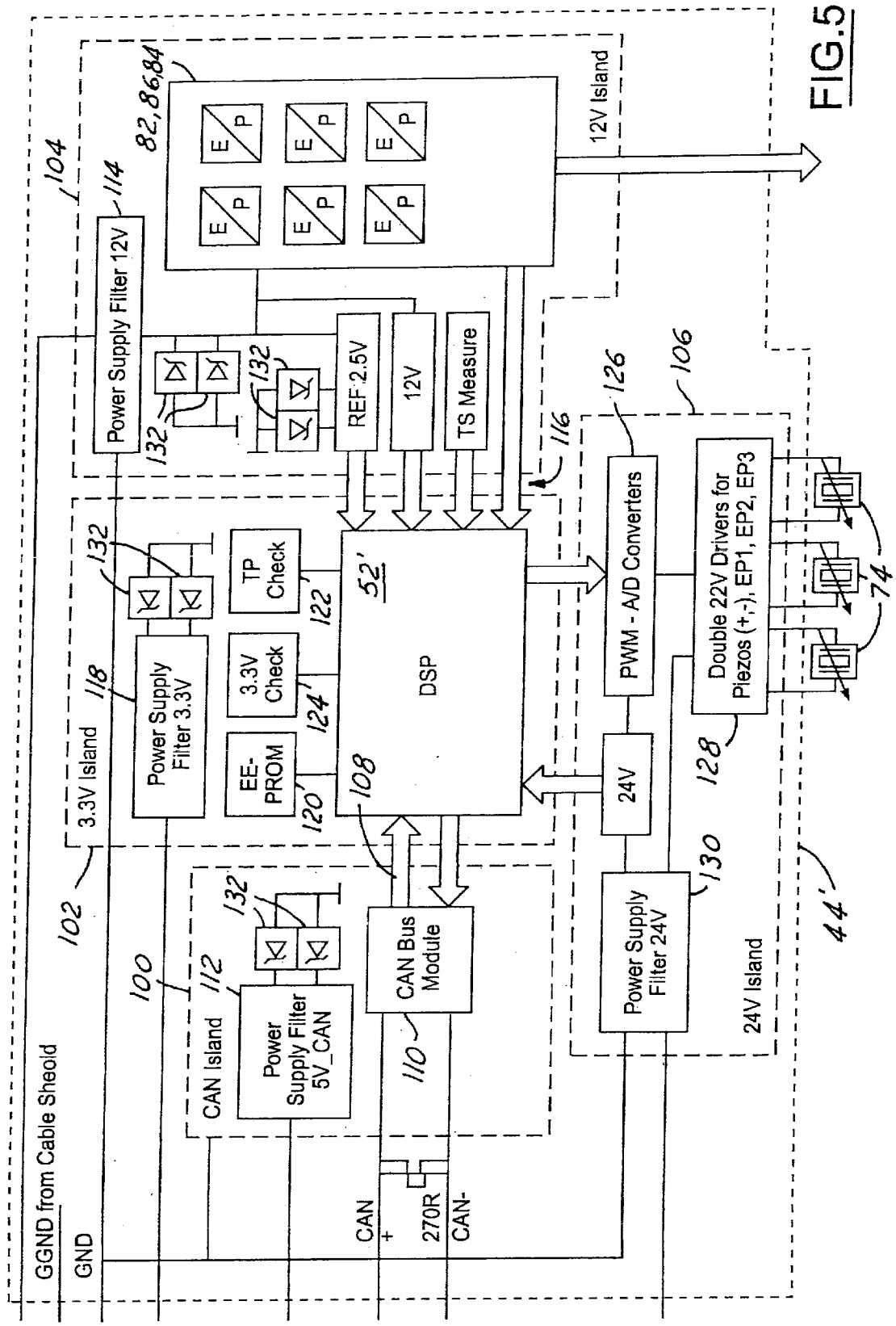
FIG. 5 is a block diagram of the electronics of an intrinsically safe paint gun controller according to an alternative embodiment of the present invention.

Referring now to FIG. 5, a diagrammatic view of an intrinsically safe gun controller 44' is illustrated. That is, gun controller 44' is configured such that the energy within gun controller 44' is sufficiently limited to significantly reduce the possibility of igniting flammable chemicals within the hazardous area. As is readily understood, energy, such as power and heat, is the product of current and voltage. Accordingly, it is important to limit either current or voltage to minimize power and heat.

With particular reference to FIG. 5, gun controller 44' is an electrical controller having a CAN island 100, a microprocessor island 102, a pressure transducer supply island 104, and a valve controller 106. CAN island 100 is electrically coupled to microprocessor island 102 via a communications interconnection 108. It should be appreciated that communications interconnection 108 may include appropriate current protection, such as resistors, if required. CAN island 100 includes a CAN bus module 110, which is adapted to replace optical controller 54. CAN island 100 converts the control signal into an electrical control signal that is input to microprocessor island 102. CAN bus module 110 preferably operates off a 5 V, low current power supply 112.

Pressure transducer supply island 104 includes a 12V power supply 114 for operating pressure transducers 82', 86'. Pressure transducer supply island 104 further provides a 2.5V reference signal, a 12V check signal, and a temperature measurement signal to microprocessor 52' of microprocessor island 102 via a communication interconnection 116. It should be understood that communications interconnection 116 may include current protection, if necessary. The 12V check signal enables microprocessor 52' to monitor the operation of 12V power supply 114.

Microprocessor island 102 includes microprocessor 52', a 3.3V power supply 118, a data storage unit 120, a temperature check 122, and a 3.3V check voltage 124. Microprocessor 52' receives the control signal from CAN island 100 and generates an output signal to valve controller 106. This output signal from microprocessor 52' may be either analog or digital. The 3.3V check voltage enables microprocessor 52' to monitor the operation of 3.3V power supply 118.

As can be seen in FIG. 5, gun controller 44' further includes a plurality of diodes 132, such as zener-diodes. The plurality of diodes 132 is frequently used to restrict the voltage to maintain the intrinsically safe condition within the hazardous area.

Accordingly, valve controller 106 may include an analog-to-digital (A/D) 126 that controls a driver module 128. Driver module 128 operates piezo electric valves 74a, 74b, 74c, 74a', 74b', 74c' and may also control the optional solenoid control valves 60a, 60b for the trigger system. Valve controller 106 includes a 24V power supply 130 that powers driver station 128 and further provides a 24V supply to microprocessor 52'.

Gun controller 44' thus provides an alternative intrinsically safe control system that is capable of supplying the requisite voltage to the various components of the system while limiting the energy produced by each component. That is, various components require various voltages and/or currents. Therefore, gun controller 44' is capable of supplying the requisite low voltage/high current to microprocessor 52' and the requisite high voltage/low current supply to piezo electric valves 74a, 74b, 74c, 74a', 74b', 74c'. Therefore, the total energy is limited in the hazardous area without compromising the power needs of the individual components of the system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An intrinsically safe pressure control system for controlling operation of a device placed in a hazardous area, the hazardous area including flammable material, a portion of the control system operating in a safe area, and a portion of control system operating in the hazardous area, comprising;
   a controller located within the hazardous area and exposed to said flammable material, the controller receiving input signals from the safe area, the controller generating a control signal; and
   a first piezo electrically controlled valve located within the hazardous area and exposed to said flammable material, the piezo electrically controlled valve generating an output pressure in response to the control signal.

2. The apparatus of claim 1 further comprising a pressure regulator valve, the pressure regulator valve being controlled by the pilot pressure output by the piezo electrically controlled valve.

3. The apparatus of claim 2 further comprising a first pressure sensor sensing the regulated pressure, the first pressure sensor generating a first pressure signal input to the controller.

4. The apparatus of claim 1 further comprising a variable output switch receiving the control signal from the controller, the variable output switch generating a variable output signal to the piezo electrically controlled valve, the piezo electrically controlled valve operating in response to the variable output signal.

5. The apparatus of claim 1 further comprising a second pressure sensor sensing the output pressure, the second pressure sensor generating a second pressure signal input to the controller.

6. An apparatus comprising:
   a robot for dispensing paint, a portion of the robot operating in a hazardous area including flammable material, the robot having an arm displaceable in accordance with electric control signals;
   a paint gun disposed at a distal end of the arm, the paint gun dispensing paint in accordance with a fluid signal;
   a controller located within the hazardous area and exposed to said flammable material, the controller receiving input signals from a safe area, the controller generating a control signal; and a piezo electrically controlled valve located within the hazardous area and exposed to said flammable material, the piezo electrically controlled valve generating a pressure in response to the control signal.

7. The apparatus of claim 6 further comprising a pressure regulator valve being controlled by the pilot pressure output by the piezo electrically controlled valve to define a regulated pressure, the regulated pressure providing the fluid control signal.

8. The apparatus of claim 7 further comprising a variable output switch receiving the control signal from the controller, the variable output switch generating a variable output signal to the piezo electrically controlled valve, the piezo electrically controlled valve operating in response to the variable output signal.

9. The apparatus of claim 7 further comprising a first pressure sensor sensing the output pressure, the first pressure sensor generating a first pressure signal input to the controller.

10. The apparatus of claim 9 further comprising a second pressure sensor sensing the boosted pressure, the second pressure sensor generating a second pressure signal input to the controller.

11. An intrinsically safe pressure control system for controlling operation of a device placed in a hazardous area, the hazardous area including flammable material, a portion of the control system operating in a safe area, and a portion of control system operating in the hazardous area, comprising:
a controller located within the hazardous area and exposed to said flammable material, the controller receiving input signals from the safe area, the controller generating a control signal; and
a first electrically controlled valve located within the hazardous area and exposed to said flammable material, the first electrically controlled valve operating within the hazardous area so as to prevent ignition within the hazardous area, the first electrically controlled valve generating an output pressure in response to the control signal.

12. The apparatus of claim 11 further comprising a pressure regulator valve, the pressure regulator valve being controlled by the pilot pressure output by the electrically controlled valve.

13. The apparatus of claim 12 further comprising a first pressure sensor sensing the regulated pressure, the first pressure sensor generating a first pressure signal input to the controller.

14. The apparatus of claim 11 further comprising a variable output switch receiving the control signal from the controller, the variable output switch generating a variable output signal to the electrically controlled valve, the electrically controlled valve operating in response to the variable output signal.

15. The apparatus of claim 11 further comprising a second pressure sensor sensing the output pressure, the second pressure sensor generating a second pressure signal input to the controller.

16. An intrinsically safe pressure control system for controlling operation of a device placed in a hazardous area, the hazardous area including flammable material, liquid or vapors, the system comprising:
a controller located within the hazardous area and exposed to said flammable material, the controller generating a control signal; and
a first electrically controlled valve located within the hazardous area and exposed to said flammable material, the first electrically controlled valve operating within the hazardous area so as to prevent ignition within the hazardous area, the first electrically controlled valve generating an output pressure in response to the control signal.

17. The apparatus of claim 16 further comprising a pressure regulator valve being controlled by the pilot pressure output by the first electrically controlled valve to define a regulated pressure, the regulated pressure providing the fluid control signal.

18. The apparatus of claim 17 further comprising a variable output switch receiving the control signal from the controller, the variable output switch generating a variable output signal to the first electrically controlled valve, the first electrically controlled valve operating in response to the variable output signal.

19. The apparatus of claim 17 further comprising a first pressure sensor sensing the output pressure, the first pressure sensor generating a first pressure signal input to the controller.

20. The apparatus of claim 19 further comprising a second pressure sensor sensing the boosted pressure, the second pressure sensor generating a second pressure signal input to the controller.

* * * * *